United States Patent Office 3,030,808
Patented Apr. 24, 1962

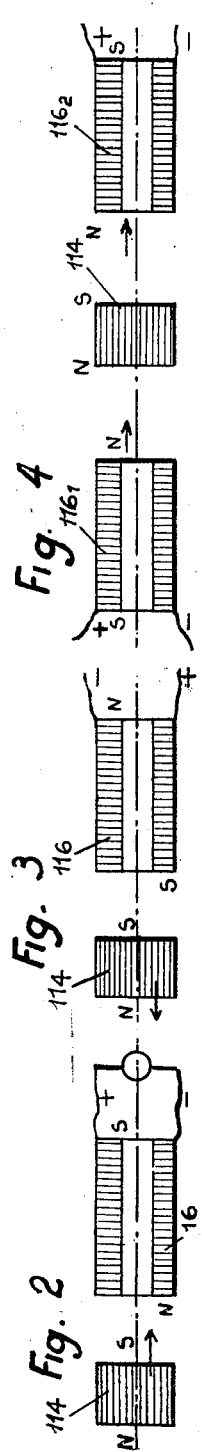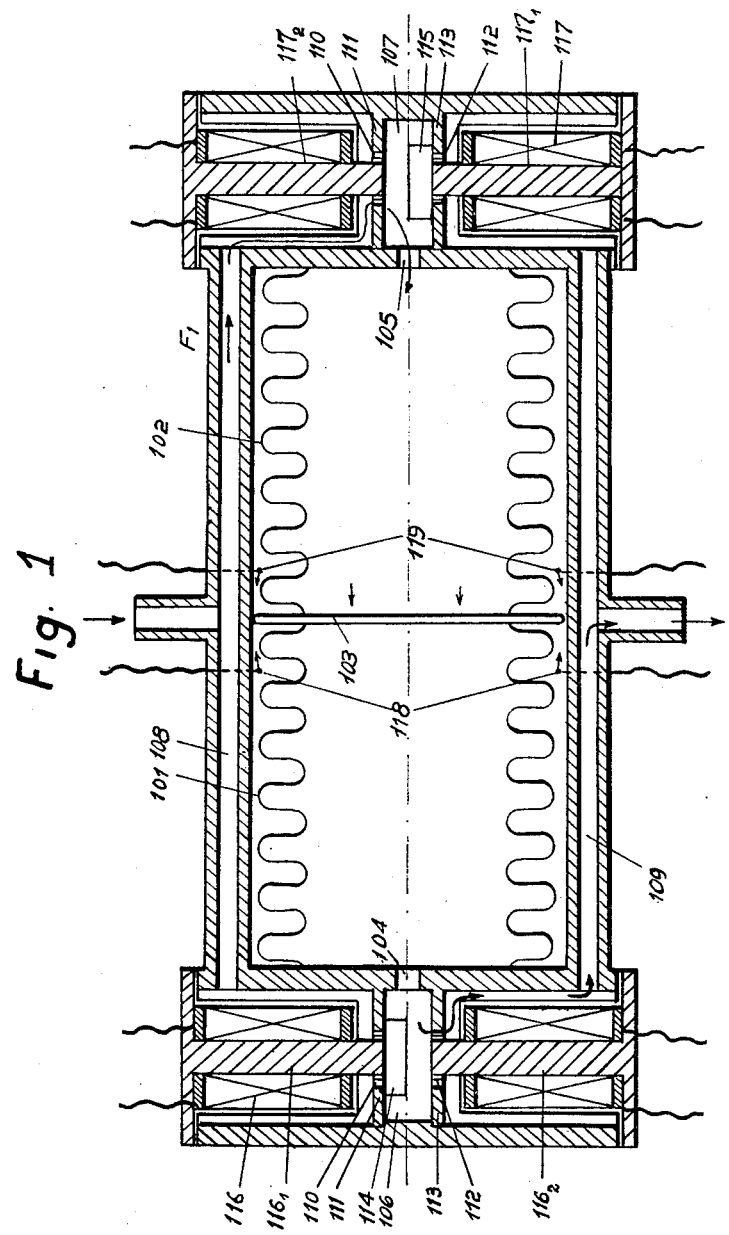

3,030,808
EQUIPMENT FOR DISTRIBUTING LIQUID AND GATE VALVE FOR OPERATING IT
Jean Faure Herman, 68 Rue de l'Est, Boulogne-sur-Seine, France
Filed Jan. 6, 1958, Ser. No. 707,154
Claims priority, application France Jan. 5, 1957
1 Claim. (Cl. 73—262)

This invention relates to a meter for liquid and is more particularly concerned with a meter comprising a liquid distribution system in which the outlets of several fluid conduits are controlled instantaneously in a manner which minimizes errors in measurement.

The meter for liquid in accordance with the invention comprises a single bellows separated into two portions by a middle partition to form two opposite resilient containers, means for distributing the liquid to be metered for successively and alternately effecting the filling and emptying of the two containers by said liquid to be metered, electric contacts on the outside of the bellows in an oil bath and positioned to be selectively engaged upon displacement of the middle partition, a source of electric current connected in a circuit controlled by said contacts to provide current impulses controlling the means for distributing the liquid, and means for metering these impulses.

A meter embodying features of the present invention is shown by way of non-limitative example in the accompanying drawing, wherein, FIG. 1 shows a sectional view of a meter constructed in accordance with the invention;

FIGS. 2 and 3 show diagrammatically an electro-magnet co-operating with a mobile unit formed by a permanent magnet, respectively in the attraction and repulsion position;

FIG. 4 shows a gate valve comprising a permanent magnet controlled by two electro-magnets.

The meter of FIG. 1 consists of two metal bellows placed end to end and forming two resilient metering containers. These bellows are separated from each other by a fluid-tight partition 103.

The bellows 101 and 102 communicate by openings 104 and 105 with distributing compartments 106 and 107, which are themselves in communication with the inlet piping 108 for liquid by means of perforations 110 made in the separating partition 111.

These bellows also communicate with the exit piping 109 for liquid, by means of perforations 112 made in the separating partitions 113.

Each of the distributing compartments 106 and 107 comprises a valve 114 which is magnetized for the distributing compartment 106, and 115 for the distributing compartment 107. Each magnetized valve alternately closes and opens the inlet perforations 110 or the flow perforations 112, so that when the bellows 101 is full, the other bellows is empty and vice versa.

The movement of the valves is controlled by electro-magnets 116 on the inlet side and 117 on the flow side. These electro-magnets are controlled by current impulses of suitable polarity supplied by electric contacts 118 and 119, each controlled by the bellows 101 and 102, when the partition 103 comes into contact with one or another of the contact blades 118 and 119.

The bellows 101 and 102 are placed in an enclosure completely filled with a liquid such as oil. This enables the isolation of any spark which might occur when a break of one of these contacts 118 or 119 takes place. Moreover, the pressure of the liquid around the walls of the bellows enables a constant value to be given to the metering volume, independently of pressure variations.

The liquid meter described above operates in the following manner.

The liquid arrives by the piping 109, goes in the direction of the arrow $F_1$ towards the distributing compartment 107, in which the valve 115 closes the outlet openings 113. The liquid passes through the inlet perforations 110 and penetrates into the bellows 102, repelling the partition 103. As soon as this partition reaches the contact 118, the latter closes and sends electric impulses into the electro-magnets 117 and 116, causing these electro-magnets to change position. Owing to this fact, the openings 110 are closed by the valve 115 in the distributing compartment 107.

On the other hand, in the distributing compartment 106, the outlet openings 112 which were previously open, are closed, whereas the inlet openings 110 are opened.

The liquid coming from the piping 109 and going towards the distributing compartment 107 is no longer admitted into the bellows 102. On the contrary, the liquid arriving through the piping 109 is admitted through the inlet openings of the distributing compartment 106 in the bellows 101, so that the middle partition 103 moves to the right, driving the liquid into the bellows 102. This liquid passes through the outlet openings 113 for entering the outlet piping 109.

It will be seen that the lengthening of the bellows 101 corresponds to the shortening of the bellows 102 and vice versa. This produces a to-and-fro movement of the partition 103.

The electric contacts 118 of one side and 119 of the other, act as abutments to the movement of the partition 103, and by the impulses which they send into the electro-magnets, cause a reversing of the flux in the electro-magnets 116 and 117 at the end of each stroke, which has the effect of reversing the positions of the valves 114 and 115 and changing the movement of the partition 103.

Each of these movements of the partition 103 corresponds to a flow of liquid of a given quantity.

It is only necessary to record on a meter, for example, for impulses, the number of contacts transmitted during operation, to ascertain the total quantity of liquid passed through the meter.

The meter described above affords numerous advantages, and more particularly the following:

(1) It enables very small and even intermittent deliveries to be metered.

(2) Absence of all friction and absence of leaks in the metering members;

(3) Lastly, the employing of electro-magnets for controlling valve distributors, enables the usual recoil springs used to be eliminated.

The mobile units 114, 115 are oriented permanent magnets. All the magnetic flux power set up by the electro-magnets is used in the movement direction of the mobile units without being, at the same time, obliged to overcome the resistance of an opposing spring.

As the mobile units have their own magnetic flux, the electro-magnets only act at the moment of changing the position of the units by the action of instantaneous electric impulses of variable sign.

Between two successive impulses, the permanent elements remain attached by their own flux to the neutral seatings, of soft iron, for example.

Obviously, numerous modifications can be applied to the above-mentioned meter without going outside the scope of the invention for that purpose. More particularly, instead of using two electro-magnets as in the device shown in FIG. 1, a single electro-magnet could be used, as shown in FIG. 2.

This single electro-magnet 116 co-operates with a mobile unit 114 formed by a permanent magnet, the north-south orientation of this permanent magnet being given by the letters N and S in FIG. 2.

If the electro-magnet 116 is fed by a source of direct electric current or by an impulse of a polarity so that the north pole is placed facing the south pole of the mobile unit, said unit is attracted.

On the other hand (FIG. 3), if the polarity of the source feeding the electro-magnet 116 is reversed, a south pole appears facing the south pole of the mobile unit 114 and there is a repulse.

This arrangement enables any antagonising spring to be eliminated. Actually, it is only necessary successively to reverse the polarities of the impulses feeding the coil 116 to obtain successively the attraction or the repulsion of the mobile unit 114.

In the case of FIG. 1, two electro-magnets $116_1$, $116_2$, co-operating by a single mobile unit 114 (FIG. 4) are used. This gives an increase of motive power acting on the mobile unit when acting so that the electro-magnets $116_1$ and $116_2$ offer the same pole facing the mobile unit 114.

Under these conditions, one of the electro-magnets $116_1$ repels the mobile unit 114, whereas the other electro-magnet $116_2$ attracts this mobile unit, and vice versa, in the case where the polarities of the sources feeding the electro-magnets $116_1$ and $116_2$ are reversed.

What I claim is:

In a meter for liquid, a single bellows separated into two portions by a middle partition to form two opposite resilient containers, means for distributing the liquid to be metered for successively and alternately effecting the filling and emptying of the two containers by said liquid to be metered, said means comprising inlet piping for said liquid and outlet piping for said liquid, a valve for each container controlling the passage of liquid from the inlet piping to the outlet piping and to its container by selectively opening the inlet piping and the outlet piping to the interior of the containers, each valve comprising a permanently magnetized valve member, electro-magnetic means, means for sending a direct current impulse in either of two directions into the electro-magnetic means so that a magnetic field of selected polarity is produced, said magnetized member being located so that said field effects the attraction or repulsion of the permanent magnets and hence the selective opening and closing of the inlet piping and of the outlet piping, electric contacts adapted to be selectively engaged upon displacement of the middle partition in response to the flow of liquid into said containers, a source of electric current connected in a circuit controlled by said contacts to provide said current impulses controlling the valve-actuating members, and means for metering these impulses.

References Cited in the file of this patent

UNITED STATES PATENTS

| | | |
|---|---|---|
| 764,572 | Fulton | July 12, 1904 |
| 1,808,387 | Thompson | June 2, 1930 |
| 2,186,307 | Polko | Jan. 9, 1940 |
| 2,547,003 | Hastings | Apr. 3, 1951 |
| 2,612,778 | Hubbard | Oct. 7, 1952 |
| 2,625,363 | Waldron | Jan. 13, 1953 |
| 2,628,059 | Hinrichs | Feb. 10, 1953 |

FOREIGN PATENTS

| | | |
|---|---|---|
| 398,331 | France | Jan. 20, 1909 |
| 210,038 | Australia | June 20, 1957 |